(No Model.)
P. J. CONROY.
TOOL FOR MAKING PINS, BOLTS, AND RIVETS.
No. 520,636. Patented May 29, 1894.
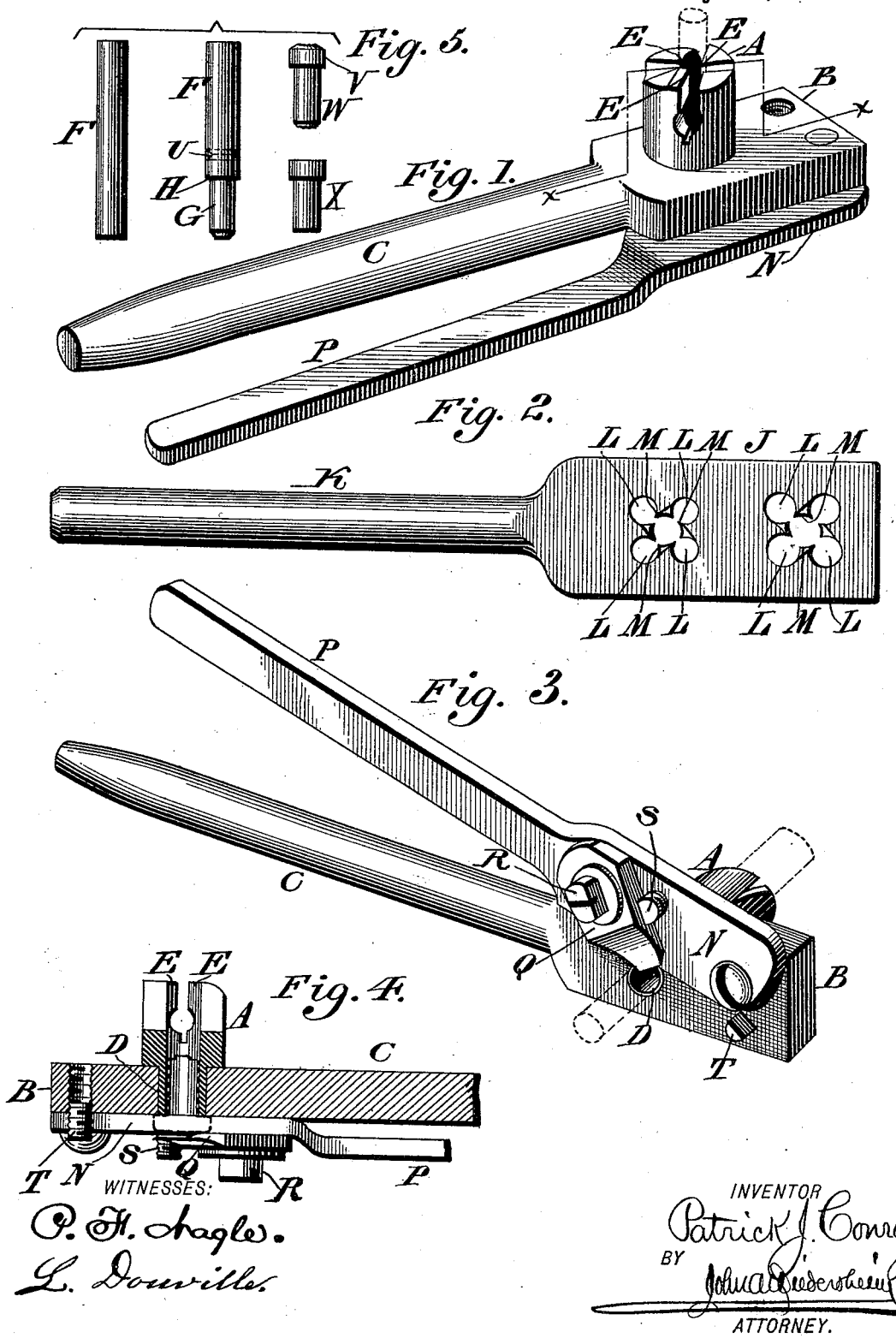

UNITED STATES PATENT OFFICE.

PATRICK J. CONROY, OF PHILADELPHIA, PENNSYLVANIA.

TOOL FOR MAKING PINS, BOLTS, AND RIVETS.

SPECIFICATION forming part of Letters Patent No. 520,636, dated May 29, 1894.

Application filed September 1, 1893. Serial No. 484,563. (No model.)

*To all whom it may concern:*

Be it known that I, PATRICK J. CONROY, a citizen of the United States, residing in the city and county of Philadelphia, State of Pennsylvania, have invented a new and useful Improvement in Tools for Making Pins, Bolts, Rivets, &c., which improvement is fully set forth in the following specification and accompanying drawings.

My invention consists of a novel tool to be employed in making pins, bolts, rivets, &c., as hereinafter described.

Figures 1 and 3, represent perspective views of tools embodying my invention. Fig. 2 represents a side elevation of one of the other tools. Fig. 4 represents a section of a portion on line $x$, $x$, Fig. 1.

Similar letters of reference indicate corresponding parts in the several figures.

Referring to the drawings: A designates a cutter which is of tubular form, and connected with the head B, which is provided with a handle C, said cutter having a tubular neck D which enters an opening in said head, and is firmly secured thereto. The walls of the opening of the cutter are partly removed, forming the cutting edges E.

J designates a plate having a handle K, and formed with openings L, the walls of which are partly removed, producing the cutting edges M.

N designates a plate which is pivoted to the head B, and provided with a handle P for conveniently operating said plate.

Q designates a blade which is secured to the plate N, so that its cutting edge is adjacent to the outer end of the neck D of the cutter A, or the opening which receives said neck, said blade being connected with the plate by the screw R, and prevented from shifting by means of the stop S, which is screwed or otherwise secured to said plate, and has the blade abutting against it. The advance motion of the blade is limited by the stop T, which is screwed or otherwise connected with the head B, and projects therefrom so as to be engaged by the plate N when the blade has accomplished its work.

In forming the pin, bolt or rivet, the blank as shown at F, is first presented to the cutting edges M of the portion of the tool shown in Fig. 2, and forced into the opening L and rotated, it is reduced as at G, leaving the shoulder H of rounded form. Then the reduced portion G is inserted in the cutter A and rotated, whereby the shoulder H is made sharp. The portion G is now introduced into the neck D at the end adjacent to the blade Q when the latter is pressed against said portion a short distance from said shoulder sufficient for the head of a pin, &c., as shown at U, whereby the blank is cut through, leaving the head V, and producing the pin, rivet, &c., as shown at W.

The top of the head presents a rough edge which may be removed, the result being shown at X.

The unused portion of the blank may be presented to cutter A, and the subsequent operations be the same as those hereinbefore described.

Having thus described my invention, what I claim as new, and desire to secure by Letters Patent, is—

1. A head with a tubular cutter thereon, and a plate pivoted to said head and carrying a blade adjacent to the opening in said cutter, said plate being held in position on said head by a screw and an abutting stop, substantially as described.

2. A head with a tubular cutter thereon, and a plate pivoted to said head and carrying a blade adjacent to the opening in said cutter, said head having a stop for abutment thereagainst of said head, substantially as described.

3. A tool for making pins, bolts or rivets, having a head with a tubular cutter provided with a tubular neck entering an opening in said head, a plate pivoted to said head, and a cutter carried by said plate, said parts being combined substantially as described.

PATRICK J. CONROY.

Witnesses:
JOHN A. WIEDERSHEIM,
R. H. GRAESER.